United States Patent [19]
Pruitt et al.

[11] Patent Number: 5,354,057
[45] Date of Patent: Oct. 11, 1994

[54] SIMULATED COMBAT ENTERTAINMENT SYSTEM

[76] Inventors: Ralph T. Pruitt, 3868 S. Fraser, Apt. M10, Aurora, Colo. 80014; Michael B. Kinder, Dream Park Corporation, 5575D Arapahoe Rd., Boulder, Colo. 80303

[21] Appl. No.: 952,924

[22] Filed: Sep. 28, 1992

[51] Int. Cl.$^5$ .............................................. F41J 5/02
[52] U.S. Cl. ................. 273/85 G; 273/57.3; 273/314; 273/454; 273/312; 482/12
[58] Field of Search ............. 273/57.3, 85 G, 310–316, 273/371, 454; 482/12; 446/405; 434/16, 22

[56] References Cited

U.S. PATENT DOCUMENTS

| | | |
|---|---|---|
| 2,916,287 | 12/1959 | Davey . |
| 3,529,822 | 2/1970 | Rubin ................................... 273/1 |
| 3,920,242 | 3/1977 | Reith et al. ......................... 273/1 F |
| 4,030,731 | 6/1977 | Delcayre ............................. 273/1 F |
| 4,099,714 | 12/1977 | Willis ................................. 273/1 F |
| 4,254,951 | 3/1981 | De Laney ........................... 273/1 F |
| 4,299,386 | 10/1981 | Kulesza et al. .................... 273/85 F |
| 4,487,583 | 11/1984 | Brucker et al. ..................... 273/311 |
| 4,619,615 | 10/1986 | Kratzenberg ......................... 434/22 |
| 4,627,620 | 12/1986 | Yang ............................... 273/375 X |
| 4,695,058 | 9/1987 | Carter, III et al. ................ 273/311 |
| 4,772,028 | 9/1988 | Rockhold et al. ................. 434/22 X |
| 4,824,107 | 4/1989 | French .............................. 482/12 X |
| 4,892,303 | 1/1990 | Lohre ................................... 272/98 |
| 4,898,391 | 2/1990 | Kelly et al. ......................... 273/310 |
| 4,904,222 | 2/1990 | Gastgeb et al. ..................... 446/405 |
| 5,145,446 | 9/1992 | Kuo ..................................... 446/405 |
| 5,194,006 | 3/1993 | Zaenglein, Jr. ....................... 434/19 |

FOREIGN PATENT DOCUMENTS

| | | |
|---|---|---|
| 3303521 | 8/1984 | Fed. Rep. of Germany . |
| 2611512 | 3/1982 | France . |
| 2588479 | 10/1986 | France . |
| 2589070 | 10/1986 | France . |

OTHER PUBLICATIONS

*Softside*, Feb. 1982, pp. 10 & 11.
*IFGS Fantasy Rules*, Sixth Edition, Apr., 1989, pp. V, VI, 2, 17, 24, 25, 26, 27, 28, 32, 33, 36, 37, 38, 41, 44, 46, 54.

*Primary Examiner*—Jessica J. Harrison
*Assistant Examiner*—Kerry Owens
*Attorney, Agent, or Firm*—Andrew M. Hassell

[57] ABSTRACT

An adventure and simulated combat system in which a playing field is divided into a grid and in which the location of each participant within the system is identified by his location within a grid. A central control module includes visual surveillance, communication facilities and a central computer for controlling the system and scoring performance. Two-way radio communication of multiplexed signals at various power levels is extensively employed; and both synchronous and asynchronous modes control and communication are described. Both contact and line-of-sight weaponry are included, and accuracy of operation is provided through improved target discrimination and the utilization of multiple modes of detection of valid target strikes.

40 Claims, 12 Drawing Sheets

SIMULATED COMBAT ENTERTAINMENT SYSTEM

This invention relates to entertainment systems and more particularly to entertainment systems employing simulated combat and the like.

BACKGROUND OF THE INVENTION

Various types of simulated combat systems have heretofore been proposed, illustrative of which are those disclosed in U.S. Pat. 3,920,242 granted to William E. Reith on Nov. 18, 1975, U.S. Pat. 4,030,731 granted to Guy Delcayre on Jun. 21, 1977, U.S. Pat. 4,892,303 granted to Gunther Lohre on Jan. 9, 1990, and French Patent Publication 2,589,070 of Apr. 30, 1987. According to these proposals, mechanical switches and electronic apparatus are provided for registering and scoring the performance of persons engaged in sports such as fencing and the like. In some instances, hit-sensing has been essentially mechanical in nature as, for example, by the provision of mechanically-operated switches physically mounted in or on the weapon, such switches operating in response to force imparted to them by the act of striking the target. In others, the system evaluates and displays valid or invalid hits from a succession of slashes, counter slashes, flat blows and thrusts and has valid hit surfaces on parts of the weapons such as the handle, the shell, a foil and/or by a metal mat. In some Instances, a vibration pickup is sensitive to acceleration and to frequency of mechanical vibrations.

In addition to systems employing mechanically-actuated sensors such as mechanical switches and the like, others have been proposed that include electronic circuits such as pulse generators mounted on the person of each combatant, such pulse generators producing pulses of distinctive polarity, form and length which represent physical contact and contribute to identification, verification and scoring.

Systems such as the foregoing have been directed principally to one-on-one contests, principally fencing where scoring valid touches has been facilitated by the absence of multiple adversaries. However, when there is introduced the complexity of multiple adversaries, differing types of targets, discrimination between different parts of the same target, different scenarios, and multiple and differing types of weapons, such prior proposals have not provided for distinction therebetween nor for a variety of parameters that such added complexity requires.

BRIEF SUMMARY OF THE INVENTION

The improved system according to the invention, includes provision for monitoring and scoring numerous combatants physically traversing relatively large geographic areas and encompassing a variety of obstacles, weapons, targets and differing combat scenarios. This is accomplished by the provision of a relatively large physical area, for example, as much as one square mile. Such area is divided electronically into a plurality of grids such as, for example one hundred. If one hundred grids are projected onto a surface area of one square mile, each grid will measure approximately 528 feet by 528 feet. In such event, a grid transmitter/receiver (transceiver) having a limited but reliable range of about 375 feet will be positioned in or near the physical center of each grid, thus providing complete coverage for the entire large physical area.

Accuracy of target identification is enhanced through the utilization of signals which are encoded so as to be distinctive of each target or discrete portions thereof, and the validity of hits or strikes on targets or distinct parts of targets is rendered substantially more accurate through the advantageous utilization of non-mechanical electronic devices such as elongated strips of distributed resistance, piezo-electric materials or the like which are positioned on potential striking regions of the simulated weapons.

In accordance with one embodiment, a coordination and service unit senses the change in resistance, piezo-electric condition or the like resulting from impact with a target or target part, together with the identity of the target or target part resulting from receipt of the aforementioned encoded signal and temporarily stores in its memory electrical indicia representing the fact of a valid hit and the identity of the target or target part. Thereafter, in accordance with one embodiment in which there are a plurality of such coordination and service units, the coordination and service units are sequentially interrogated by the grid transceiver, and each such unit then transmits during its turn, electrical indicia representing target scoring information from its memory.

In accordance with the other embodiment, the coordination and service unit senses the change in resistance, piezo-electric condition or the like resulting from impact with a target or target part, together with the identity of the target or target part resulting from receipt of the aforementioned encoded signal and temporarily stores in its memory electrical indicia representing the fact of a valid hit and the identity of the target or target part. Immediately thereafter, the coordination and service unit listens on a predetermined frequency and, if such frequency is not in use, voluntarily and momentarily transmits to the grid transceiver electrical indicia representing target scoring information from its memory.

OBJECTS AND FEATURES OF THE INVENTION

It is one general object of the invention to improve simulated combat entertainment systems.

It is yet another object of this invention to increase the versatility of such systems.

It is another object of this invention to provide a high level of interactive gaming in such simulated combat entertainment systems.

It is still another object of the invention to facilitate production and installation of such simulated combat entertainment systems.

It is still another object of the invention to improve the ability of equipment used in such systems to distinguish between targets and to facilitate scoring.

It is still another object of the invention to improve discrimination between valid and invalid incidents thereby to correspondingly improve immunity to spurious signals and improve accuracy of scoring.

It is still another object of the invention to facilitate and improve communications between selected portions of simulated combat entertainment systems.

Accordingly, in accordance with one feature of the invention, a unique electrical signal is imparted to each target or target part, thus facilitating identification thereof.

In accordance with another feature of the invention, a simulated weapon is fitted with a non-mechanical contact pressure transducer thereby to produce an electrical condition representing actual physical contact by a predetermined portion of the simulated weapon with another object.

In accordance with another feature of the invention, the simulated weapon includes a sensor for detecting and identifying the aforementioned unique electrical signal, thus providing an electrical identification of proximity or contact with a target or target part.

In accordance with yet another feature of the invention, provision is made for recognizing the aforementioned electrical condition representing actual physical contact and concurrently identifying the target or target part with which such physical contact is made, thus providing for target contact and identification verification.

In accordance with still another feature of the invention, provisions are made for line-of-sight type weapons such as crossbows, long bows and the like; and provision is made for remote sensing of the identity of targets and of the accurate aiming of such weapons, thus adding substantially to the versatility and authenticity of the System.

In accordance with still another feature of the invention, a plurality of target coordination and service units are provided, each producing a plurality of encoded target or target part identification signals, thus facilitating the implementation of the foregoing features.

In accordance with still a further feature of the invention, each of the target coordination and service unit target coordination and service units includes memory for temporarily storing electrical indicia indicative of valid target strikes and for transmitting such electrical indicia to a higher level consolidation and scoring circuits, thus facilitating system control and surveillance.

In accordance with yet another feature of the invention, in one embodiment, the target coordination and service units are sequentially polled by the higher level consolidation and scoring equipment, thus facilitating accuracy in communications.

In accordance with still another feature of the invention, in an alternate embodiment, there is provided within the target coordination and service units circuits that are effective to detect the presence of an electrical signal on a predetermined communication channel frequency and, when the channel frequency is not in use, to transmit immediately to the higher level consolidation and scoring equipment electrical indicia indicative of a valid target strike, such target coordination and service units circuits being further effective when detecting the presence of an electrical signal on the predetermined communication channel frequency to delay such its transmission until the frequency becomes free.

These and other objects and features of the invention will become apparent from the following detailed description, by way of a preferred example, with reference to the drawings.

DESCRIPTION OF A PREFERRED EMBODIMENT

Figure 1:
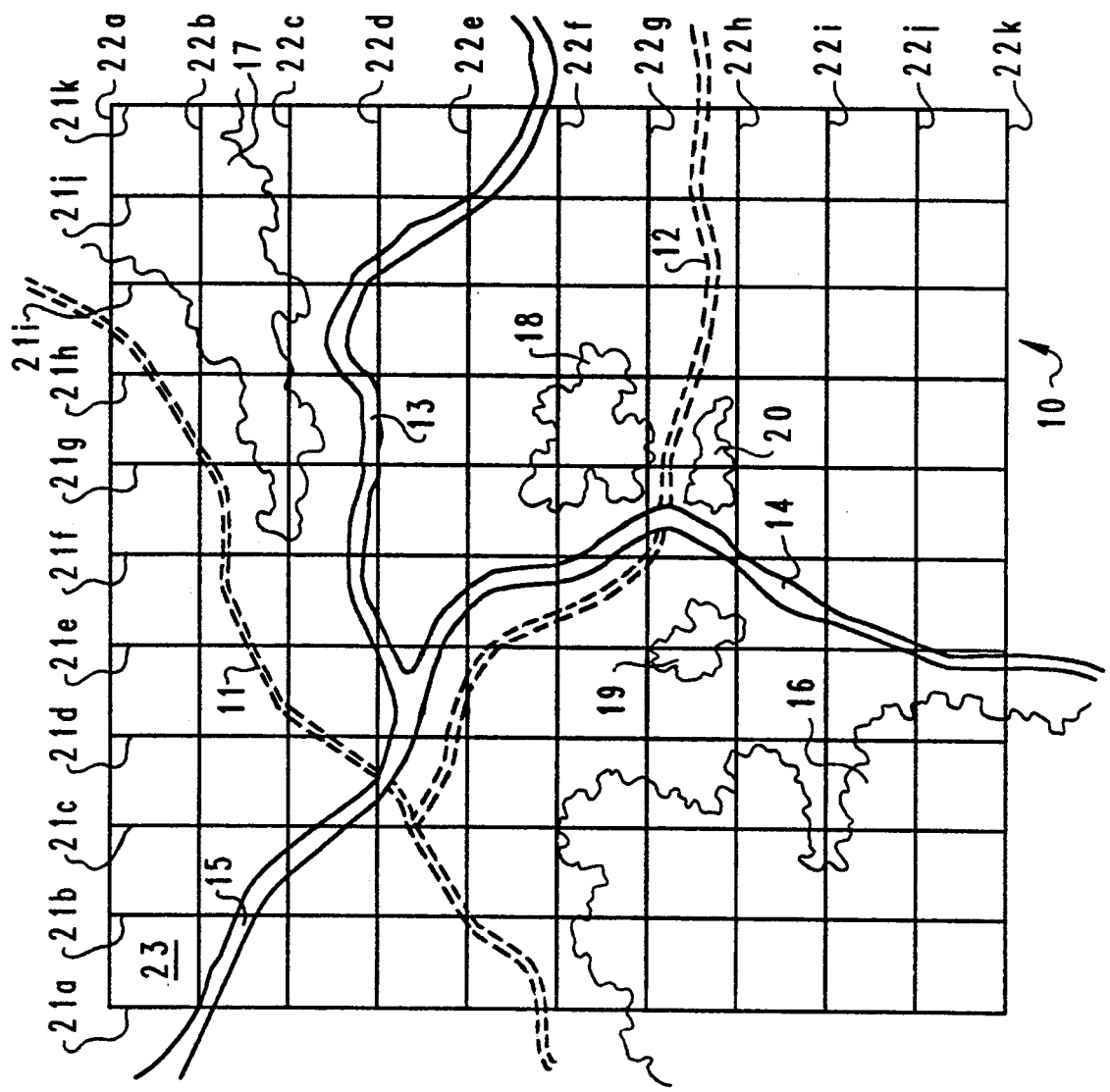
FIG. 1 is a top view of a simulated amusement park showing simulated terrain features and superimposed grid lines that divide the park area into a plurality of grids.

Now turning to the drawing, and more particularly FIG. 1 thereof, it will be observed that it depicts a top view of a playing field of a simulated amusement park generally shown at 10, having simulated terrain features such as roads 11 and 12; creeks 13 and 14 forming river 15; woods 16 and 17; and vegetation clusters 18, 19 and 20. Superimposed thereover are imaginary uniform grid lines 21a–21k and 22a–22k that electronically divide the park area into a plurality of grids of one-tenth by one-tenth miles. Although according to the illustrative embodiment hereof (and where available space permits), the overall dimensions are preferably one mile by one mile, it will be evident to those skilled in the entertainment arts that other overall dimensions might be preferable in specific situations according to the amount of space available. Moreover, although in the preferred embodiment as shown there are 100 squares each measuring one-tenth by one-tenth mile (e.g., the upper left hand grid 23 which is bounded by grid lines 21a–21b and 22a–22b), greater or lesser dimensions could be assigned provided that certain system parameters be correspondingly adjusted as will be evident from the following description. For example, if the dimensions were to be enlarged, the transmitting and receiving characteristics of certain of the communications links would need to be adjusted correspondingly.

Figure 2:
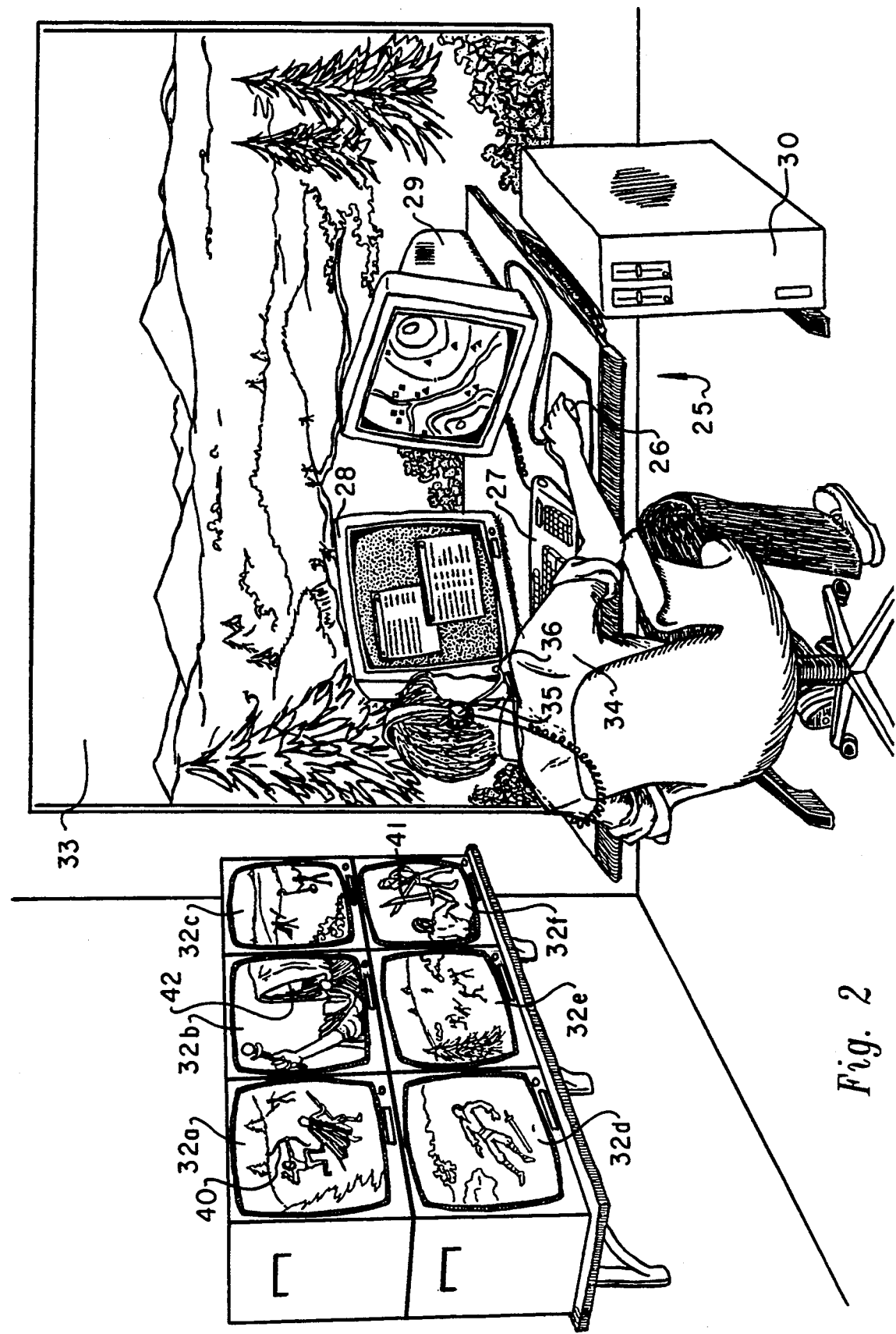
FIG. 2 is a pictorial view of a central control station depicting a Game Master viewing monitors and operating controls.

FIG. 2 illustrates the interior of the central game control facility. There, it will be observed, is console position (work station) 25 having a conventional controller (e.g., mouse) 26, a conventional computer keyboard 27, and two large color display terminals 28 and 29. Adjacent the console position 25 there preferably is positioned a Central Control Computer 30 which may be any of a variety of work station type computers well known in the art such as a Sun Microsystems work station or a Digital Equipment Corporation VAX 5000.

In addition to the foregoing, there preferably are included a plurality of monitors 32a-32f which are provided to display close-ups of selected portions of the overall enlarged playing field projection 33.

The Game Master 34 is seated at console position 25 and is in communication with the electronic control, communication, scoring and audio interactive units as will be described below. To assist in such actions, he is provided with earphones 35 and boom microphone 36. Of course, other conventional control and communications accessories could be employed, depending upon the particular combinations of features desired to be embodied in the system, it being contemplated by the inventions hereof that the Game Master controls have the full capability of controlling selected accessories to activate or de-activate them, alter their dispositions and conditions and cause them to be responsive or unresponsive as conditions of play suggest.

Remote monitoring by video is well known in the art; and the remote monitoring capabilities of the system make use of techniques and equipment well known to those skilled in the art and generally available from many commercial vendors. In utilizing such equipment, (as described hereinafter in connection with FIG. 8), advantage is taken of the ability to control direction, field of view and focus of cameras positioned on the playing field 10 so as to facilitate monitoring and observation by the Game Master 34.

To facilitate game control by the Game Master, provision is made for either portraying selected players and/or accessories as real objects or as icons, the latter being particularly useful to the Game Master since portrayal by the use of icons facilitates the combinational features of both identification and status. Thus, status may be portrayed concurrently with identification by display in a color that represents condition. For example, display of an icon representing a participant by the color red could signify that such participant has suffered a simulated fatality; whereas display of an icon representing a participant by the color yellow could signify that such participant has been wounded. Of course, identification of the particular participant could readily be accomplished by any of a variety of indicators as, for example, by including within the icon (or other representation of a player) a number or name unique to that participant.

Other features are optionally provided within the system. Thus, reference to monitors 32a-32f reveals the inclusion of icons representing persons with differing weapons (e.g., a bow 40 in monitor 32a or a sword 41 in monitor 32f), the presence, readiness or activation of simulated supernatural persons (e.g., witch, fairy or warlock 42 in monitor 32b) and/or events which can be either natural or simulated supernatural such as the casting of a spell on a participant (as hereinafter described).

Provision also is optionally made for other graphic or pictorial representations to be employed and visually portrayed on displays presented to the Game Master. Thus, monitor 28 is shown as displaying game-in-progress statistical data which can be any of a variety of types as necessary or desirable for the Game Master to develop and/or control progress of the game.

Figure 3:
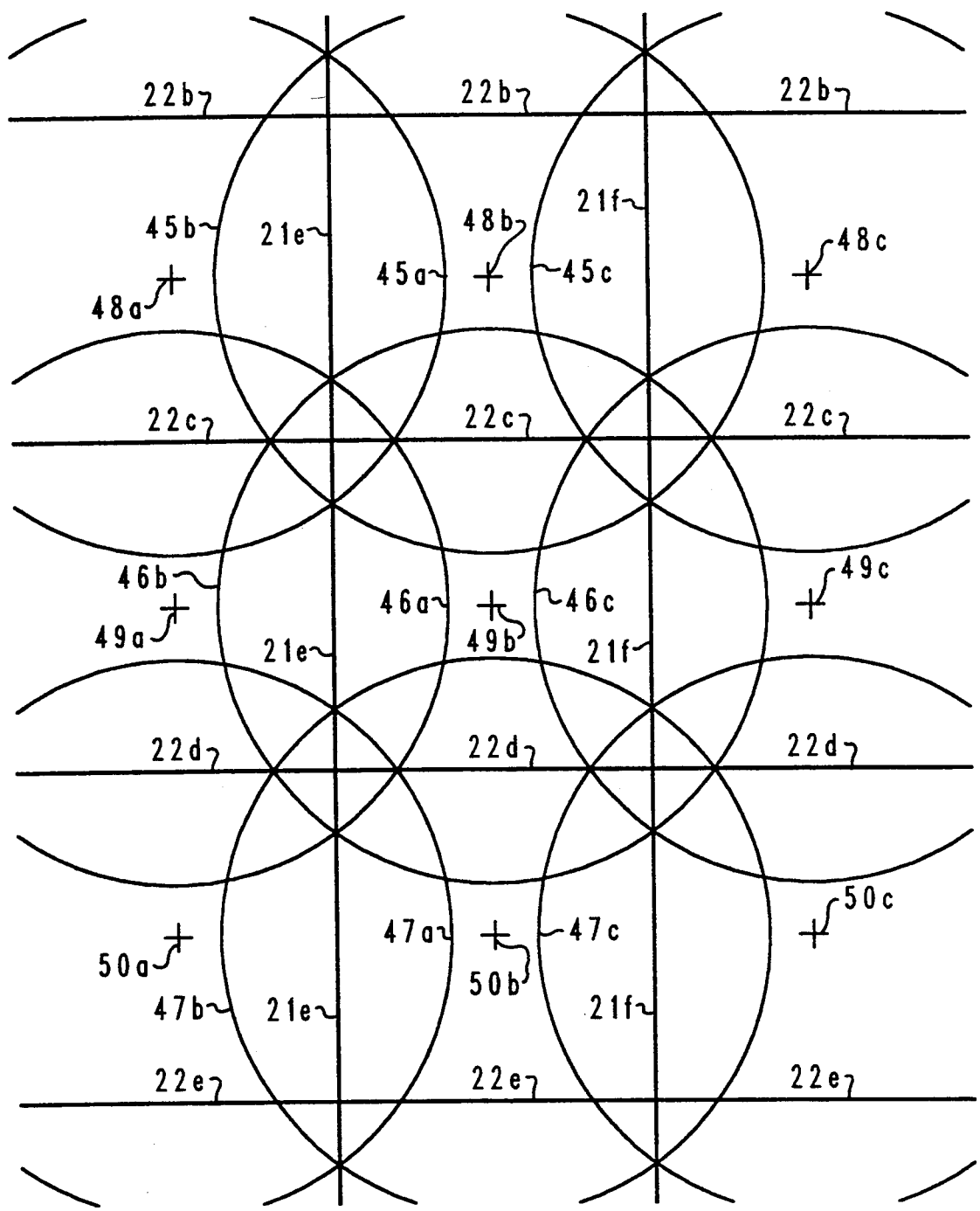
FIG. 3 is an enlarged schematic representation of a portion of FIG. 1 illustrating the grid lines and the overlapping nature of radio frequency communications.

FIG. 3 illustrates the overlapping of communications capabilities that occurs when a single grid transceiver is positioned centrally of each grid square. Although any set of adjacent grid squares could be portrayed by FIG. 3, for purposes of description and illustration, grid squares bounded by grid lines 22b-22e and 21e-21f are shown. Overlapping circles 45a-45c, 46a-46c and 47a-47c define the nominal limits of transception by transceivers 48a-48c, 49a-49c and 50a-50c which are centered respectively therewithin. Provision is made, in accordance with conventional techniques, for adjustment of transmitted power and receiving sensitivity for the transceivers so that they can be individually adjusted to provide the range represented by the aforementioned overlapping circles and so as to provide for periodic maintenance and adjustment.

In accordance with the preferred embodiment (and as mentioned above), each grid measures one-tenth by one-tenth mile. This, of course, equates to approximately 528 feet by 528 feet. Since the aforementioned transceivers are located essentially centrally within the grids, the transceiving range should extend to at least the distance from the transceiver to the grid corners. As will be evident to those skilled in the arts, this would be at least half of 528 divided by the square root of 2 over 2, or 373 feet. Of course, and in order to compensate for transmission anomalies, the range would need to be extended modestly so as to extend moderately beyond the grid corners as is illustrated by the aforementioned overlapping circles 45a-45c, 46a-46c and 47a-47c.

Figure 4:
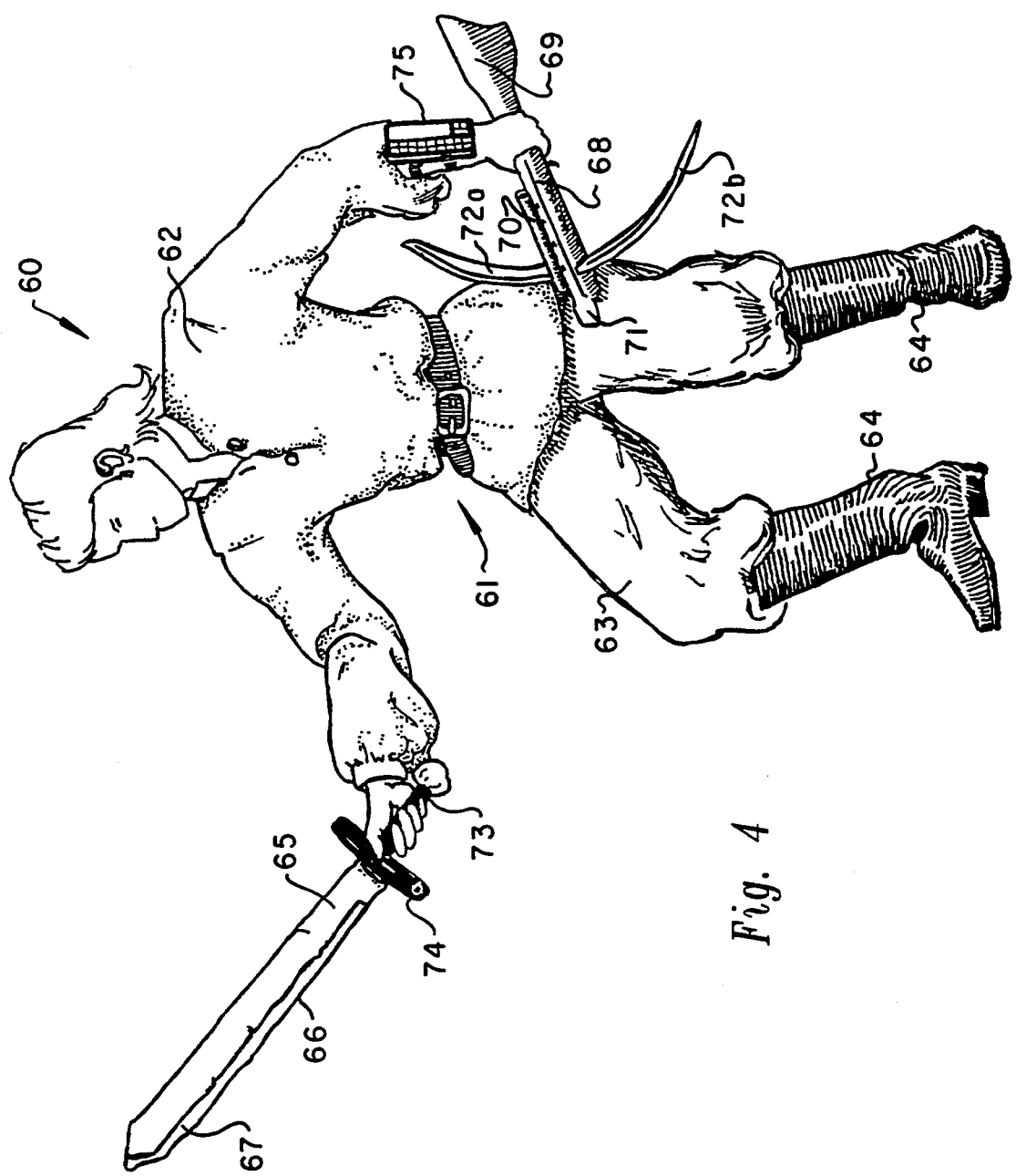
FIG. 4 is a pictorial depiction of one of the participants showing representative items of clothing and mock weapons, together with a typical target coordination and service unit.

FIG. 4 pictorially displays certain of the prominent features of the invention. There, it will be seen, is a gaming participant 60 wearing a costume 61 which is shown for illustrative purposes only as comprising a tunic or shirt member 62, trousers 63, and boots 64. It should be understood that if it is desired to identify portions of the participant's body as discrete sub-targets (as described below), the discrete sub-target areas may be electrically isolated from each other by known techniques such as including at costume seams which separate the selected individual target areas suitable insulating materials; and the identification provided by the hereinafter described identifying signals may thus be enhanced. However, it should be understood that such costumes are not required, and that an acceptable level of signal identity can be provided by conducting identifying signals directly to target (body) regions.

Participant 60 is seen to be holding a simulated sword 65 which includes along at least one edge 66 thereof, an elongated strip 67 comprised of special material that exhibits an electrically resistive or piezo-electric quality as discussed in greater detail below. He also is carrying a line-of-sight weapon, in the illustration a simulated cross-bow 68. Cross-bow 68 includes a conventional stock 69, a sighting tube 70, forward body projection 71, and cross arms 72a and 72b. Also shown is a Target Coordination and Service Unit (TCSU) 75 which may be referred to hereinafter as a Personal Service Unit (PSU). As will be described in greater detail below, this TCSU (PSU) acts as a coordination and focal point for developing selected electrical and audio signals and communicating them to and from the participant and various points of the participant's clothing and weapons, for sensing and verifying validity of hits made onto the person or weapons of the participant, of the simulated condition of the participant, and of recording and displaying the scores of a scoring system according to the game in progress.

Although the TCSU (PSU) is shown as a single unit worn on a forearm of the participant, it will be evident that its circuits, functions and displays could be separate discrete items of hardware if desired. For example, the portion which communicates with the grid transceiver (as described below) could be separate from the remainder; and such portion could be carried on the back, around the waist, or at some other convenient part of the participant's body.

Figure 5:
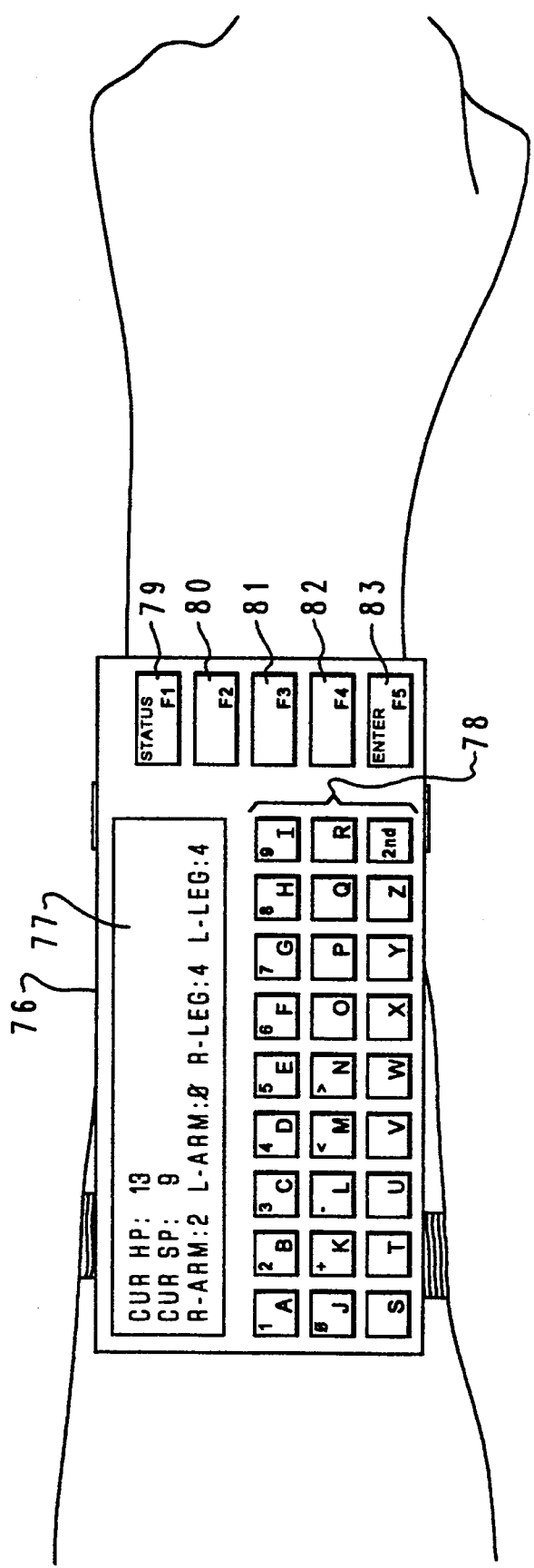
FIG. 5 is a pictorial view illustrating a typical target coordination and service unit worn on a participant's forearm.

FIG. 5 depicts a preferred form of the TCSU (PSU) of FIG. 4. There, it will be observed, is shown a conventional housing 76, a display 77 such as a liquid crystal display well known in the art, a plurality of function keys 78 including alpha-numeric keys A–Z and 0–9, together with Status/F1 key 79, F2 key 80, F3 key 81, F4 key 82 and Enter/F5 key 83. The quantity and identification of these keys is illustrative only, it being understood that depending upon the design of the connected circuits, more or fewer of such keys might be necessary or desirable.

In connection with this description of the TCSU (PSU), it may be helpful to note that the individual circuit constituents themselves are circuits that except to the extend noted below, are known in the art and are evident to those skilled in the electronic arts. Thus, for example, signal sources such as oscillators are well known and established components of electrical circuits, and any one of a variety thereof could be advantageously employed in practicing the principles of the invention. As another example, the arts of multiplexing and digital encoding are also well established, and any of a variety of multiplexing and digital encoding circuits could advantageously be employed in practicing the invention. Accordingly, in certain of the following drawings, such well-known circuits are represented by properly designated blocks rather than by detailed schematic diagrams which could inordinately increase the length and complexity of the description hereof without adding to the understandability of the invention and ease of practice thereof.

Figure 6:
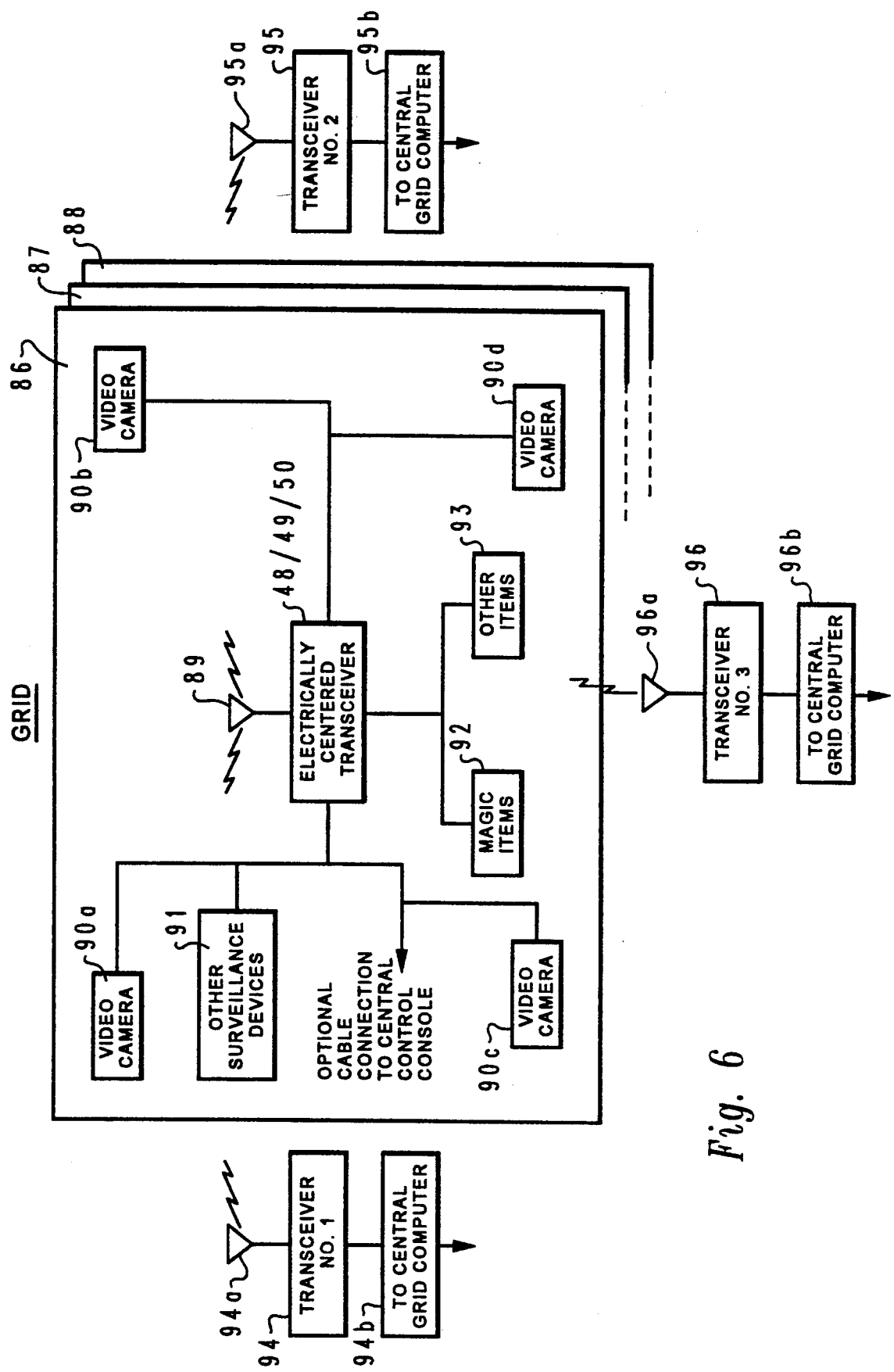
FIG. 6 is a diagram illustrating principal components associated with each of the aforementioned grids.

Now turning to FIG. 6, a plurality of representative grids are depicted with the numerals 86, 87 and 88. Each of these includes the principal surveillance, monitoring, control and communications links as shown. The electronically centered transceiver(s) are identified with the symbols 48/49/50, corresponding to the prefix numerals with which the centrally positioned transceivers are identified in FIG. 3. Each such transceiver is, of course, provided with a conventional antenna such as antenna 89. While considering the electronically centered transceivers, it should be noted that the electrically centered transceivers are not necessarily centered physically, although it is contemplated that in the majority of instances they will be located at the central physical locations of the grids. More importantly, they are centered electrically; that is, they may be located slightly asymmetrically physically so as to project electrical signals that are symmetrical throughout the grid, thus principally compensating for asymmetrical attenuation that may be occasioned by physical anomalies such as clumps of vegetation and the like.

Representative surveillance items are video cameras 90a–90d which are conventional remotely controllable cameras well known in the video arts. Cameras 90b and 90d are shown as being connected by electrical links to electrically centered transceiver 48/49/50, whereas cameras 90a and 90c are shown as being optionally connected by cable to the central control console shown and described in FIG. 2. Of course, it will be evident to those skilled in the art that all or part of the cameras could be fully cable-connected, all or part could be wireless connected, or there could be a combination of cable and wireless connections for the cameras, all in accordance with well known techniques.

In addition to video cameras, the advantageous utilization of other surveillance devices 91 is contemplated hereby. Thus, for example, proximity detectors such as those well known in the arts could be deployed within one or more of the grids so as to identify location of participants or so as to automatically trigger playing field events such as activation of the modernistic, futuristic or "magic" items 92 to which reference is made in the immediately following paragraph.

As mentioned above in connection with FIG. 2, the system hereof contemplates the inclusion of simulated modernistic, futuristic, supernatural or so-called "magic" items such as those represented by rectangle 92. Such items could include, for example, simulations of modernistic laser weapons, futuristic ray guns, apparitions or representations of fictional objects. In addition, and in consequence of the large variety of optional objects or representations contemplated herein, such variety of optional objects or representations is depicted by rectangle 93.

Strategically positioned adjacent the periphery of each of the grids (e.g., grid 86, 87, 88 . . . n) are three triangulation transceivers and antennas which, in FIG. 6 are identified with the symbols 94 and 94a, 95 and 95a, and 96 and 96a. In accordance with principles well known in the art and to which reference is made in greater detail below, the position of any participant within a grid is continually monitored, and the positioned calculated, in response to encoded electrical signals emitted by the TCSU (PSU) of each of the participants within the grid. Such information is then communicated by either conventional cable or wireless links 94b, 95b and 96b.

Figure 7:
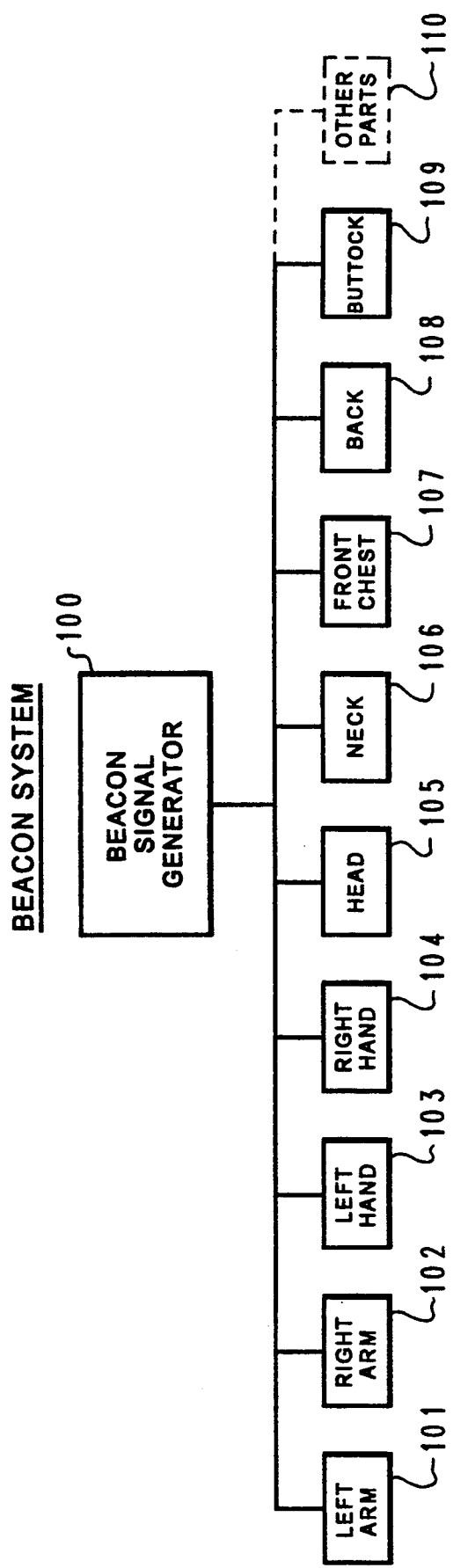
FIG. 7 is a block diagram illustrating the Beacon System in accordance with the principles of the invention.

It is important that individual targets or target areas be identified so as to facilitate computation of simulated damage inflicted by weapons and events. Accordingly, in the preferred embodiment there are provided signals unique to differing targets such as different body parts so that sensing of simulated damage (e.g., wounds, severed limbs, incapacitation or death) can be readily computed. Such provision of individual signals is illustrated in FIG. 7 which is denominated the Beacon System. There, preferably, there is provided a conventional signal generator 100 which generates an electrical signal of about 40 kilohertz. This 40 KHz signal is modulated with the standard ASC 256 bit coding so as to provide a potential for unique identification of 256 different targets/target areas. For example, a first code may be assigned to identify the left arm 101, a different code to right arm 102, still a different code to left hand 103, another to right hand 104, another to head 105, another to neck 106, another to front chest 107, still another to back 108, another to buttock 109, and other individual codes (represented by dashed rectangle 110) to other body or target parts such as the right thigh, the left thigh, the right knee, the left knee, the right calf, the left calf, and the right and left feet.

Encoding of the Beacon Signal may be accomplished centrally at the Beacon Signal Generator 100 and distributed to the various target areas by such well-known techniques as multi-plexing, or the signal can be individually encoded at the distributed locations (e.g., physically at the individual target areas), the selection as between such techniques being a matter of choice.

As mentioned above, generation of such basic frequency and the digital encoding thereof are techniques well known in the art and consequently are not further described, the important feature being that each desired target or target area is provided with a unique identifying signal. Moreover, although it is contemplated that in the preferred embodiment, the beacon signal generator is included within the aforementioned Target Coordination and Service Unit (TCSU) which also herein is referred to as the Personal Service Unit (PSU), in some installations, and depending upon the physical embodiment of the principles hereof, it may be desired to provide the Beacon Signal Generator as a separate and discrete item of hardware.

Figure 8:
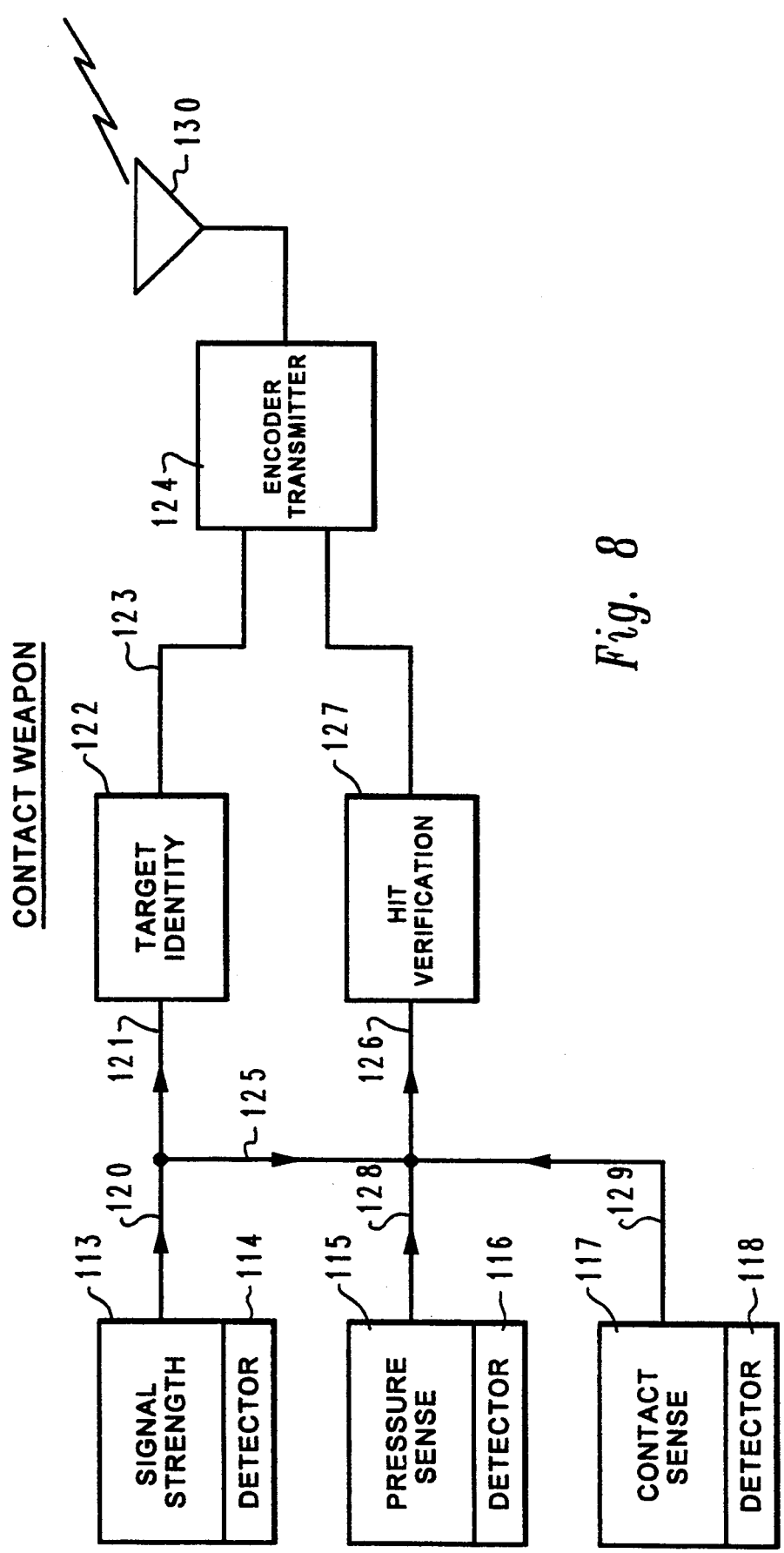
FIG. 8 is a diagram illustrating operation of the contact weapons in accordance with the principles of the invention.

It will be recalled that principal features of the invention include improved identification of targets together with the enhanced detection and validation of selected incidents (e.g., target hits). To facilitate description of such features, it will be helpful to consider weapons in two categories: (1) Those of the physical close contact variety including such weapons as billy clubs, stun sticks, swords, daggers, clubs, axes, maces, lances, spears and the like); and (2) Those of the shooting variety such as modernistic laser guns, futuristic ray guns, bows and arrows, cross-bows and bolts, and other projectile or projection weapons. In the past, and as mentioned above, there have been problems with identification and scoring simulated combat when weapons of the first category have been used. FIG. 8 illustrates the techniques according to the invention hereof that have been found particularly advantageous in overcoming the previous problems. Basically, they include reliable physical contact identification by including at least two concurrent physical contact detectors together with reliable target identification as will now be described.

In FIG. 8, signal strength detector 113 and accompanying detector 114 are seen to be provided to include two functions: the first is to identify the struck target by reading its unique code which is described above; and the second is to respond to the abrupt change in the strength of the target beacon signal when contact is made. Suitable signal strength sensors and detectors are well known in the art, and any of a variety of such known sensors and circuits are suitable for inclusion within the physical contact weapons.

Pressure sensor 115 and the accompanying pressure sense detector 116 are provided as illustrated by the elongated distributed resistor or piezo-electric strip 67 as mentioned in connection with the description of FIG. 4. In more detail, and in installations utilizing distributed resistors that change in resistance with physical pressure, a suitable resistive material is that sold in 20, 22 and 24 inch lengths by the Interlink Company of Carpenteria, Colo. This material exhibits substantial changes in resistance when subjected to physical pressure, thus making it suitable for such use and facilitating the detection of such resistance change by any of a variety of resistance measuring circuits well known in the art. Examples of such resistance measuring circuits are the well-known resistance bridge circuits in which the resistance to be measured is connected in one arm of a basic conventional resistance bridge, and wherein changes in resistance are manifest by changes in electrical potentials at the bridge terminals.

As is well known to those skilled in the electronic arts, piezoelectric materials are a class of materials that exhibit the qualities of electrical potential generation when subjected to changes in physical stress. Any of a variety of piezoelectric materials well known in the art are suitable for practicing the principles of the invention; and any of a variety of electrical potential detection circuits are suitable for sensing the presence of such potentials for actuating known detection circuits.

Optional contact sense sensor 117 and accompanying contact sense detector may be included to provide an additional level of contact verification. Such contact sense sensor may be mechanical in nature and according to the preferred embodiment, is in the form of an inertial element that produces a detectable electrical signal when actual physical contact occurs. Examples of such an inertial element is a spring-loaded physical contact that is in the open electrical condition unless and until a predetermined threshold of inertia is exceeded, in which event the contact overcomes the spring bias holding it open and makes momentary electrical connection with an associated electrical contact. Such inertial switches are well known in the art, and any of a variety that are commercially available are suitable for use in practicing the principles of the invention.

In order to ensure accuracy of valid hit sensing, there must be simultaneous registration by signal strength sensor/detector 113/114 and either or both of the pressure sense sensor/detector 115/116 and the contact sense sensor/detector 117/118. Ordinarily, verification by only one of the latter is necessary to provide a very high level of accuracy. However, if it is desired to add another degree of valid hit sensing accuracy, validation by both of the latter may be employed. Circuits for performing such validation are well known in the art and could include, for example, simple "AND" or "OR" circuits as will be evident to those skilled in the art.

As mentioned above, target discrimination is provided through detection of the aformentioned signals that are encoded with codes that are unique to each target. Accordingly, when signal strength sensor/detector 113/114 responds to the aforementioned abrupt change in signal strength resulting from physical contact of the weapon with a target, a representation of the unique code is transferred via paths 120 and 121 to target identity circuits 122 which may either decode or perform a validity check (or both) on the encoded identification information in accordance with standard techniques well known in the art. For example, in the preferred embodiment, a conventional band-pass filter is included to pass the encoded (modulated) carrier and to attenuate spurious signals. Then, the signals are demultiplexed, decoded and checked for validity by conventional circuits, if the decoded information passes the validity check, an identification signal is extended via path 123 to a simple very low power encoder/transmitter 124 that communicates such information to the aforementioned Target Coordination and Service Unit (TCSU), (FIG. 11), which as will be recalled, is also known as the Personal Service Unit (PSU). As will be evident from reference to FIG. 11 and the following description, similar band-pass filters, demultiplexing and decoding circuits are provided in the Target Coordination and Service Units.

The aforementioned hit-indicating signal emanated from the signal strength sensor/detector 113/114 is also conducted via paths 120, 125 and 126 to Hit Verification circuits 127 which validates such signal as being validly indicative of a hit only if a companion signal from one or both of sensors 115/116 and 117/118 is also received via paths 126, 128 and 129. As mentioned above, such circuits are relatively simple and well known in the art. For example, the concurrent presence of a principal and a validating signal could readily be indicated by the output of a simple "AND" circuit, and the concurrent presence of a principal and two validating signals could be indicated by the outputs of a pair of such circuits.

It is contemplated that the low power encoder/transmitter circuits 124 would readily be physically located in the weapon with which they are associated. Thus, for example, such circuits could advantageously be located in the handle 73 of the sword 65 (FIG. 4), and the miniature antenna 130 could be molded into the hand guard 74 in accordance with techniques well known in the arts of compact antennas (e.g., the small flexible "rubber-duck" antennas widely utilized with small portable transceivers). However, and because of the very close proximity of the encoder/transmitter 124 to the Target Coordination and Service Unit (TCSU) with which it communicates, even a very rudimentary "antenna" would be operative.

Figure 9:
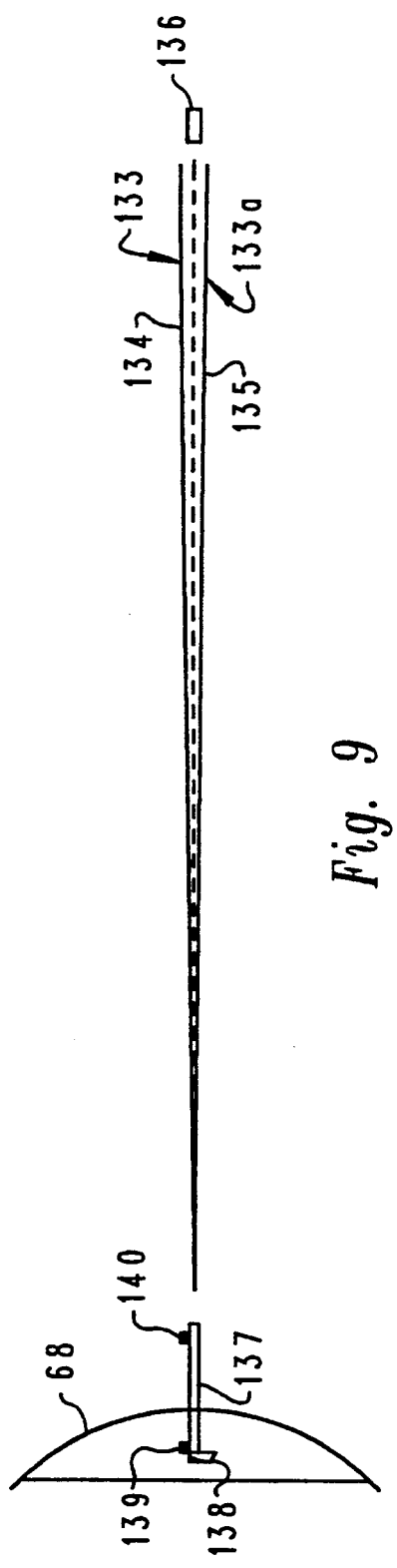
FIG. 9 is a view illustrating a typical line-of-sight weapon such as a simulated crossbow.

Before referring to FIG. 9 which illustrates operative features of the Line-of-Sight weapons, it may be helpful briefly to consider the principles of operation thereof. As mentioned previously, each participant is provided with a Beacon electrical signal generator that is modulated with digital data unique to that participant. In addition, various targets associated with that signal generator are identified with codes that are severally unique to those targets so as to provide a way to identify them positively and distinguish them from other targets that are related to such participant. Such codes are used to modulate the electrical signals generated by the beacon signal generator before such modulated signals are then individually distributed to the targets. A somewhat similar system is provided for the Line-of-Sight weapons. For them, similar signals are conducted to infra-red emissive transducers that are physically mounted on the individual targets, and the transducers emit infra-red energy that is modulated with similar identifying codes. Line-of-Sight weapons are each provided with an infra-red energy detector whose field of view is extremely limited and is in alignment with the simulated "bore sight" of the weapon. For example, the field of view of an energy detector mounted on a simulated cross bow subtends only an arc of about one degree (or less), depending upon the accuracy precision for which the weapon is intended. Consequently, the infra-red energy detector mounted on the Line-of-Sight weapon senses the encoded infra-red energy emitted by any given target only when the weapon is accurately pointed to that target. When the simulated weapon is activated (i.e., "fired") as by operation of a trigger, push-button or the like, the output of the infra-red energy detector is momentarily sampled (e.g., for one tenth of a second) by circuits that are well known to those skilled in the art, and the output is then processed to determine signal strength and the encoded identification of the source (i.e., the target). If the signal strength is at or above a predetermined threshold level, and if the code is a valid code for targets then in play on the simulated playing field, the detection circuits momentarily activate a low-powered transmitter to transmit to the Target Coordination and Service Unit (TCSU) a signal indicative of a hit on the identified target. On the other hand, if the signal strength is below the predetermined threshold level or if the detected code is invalid, the simulated firing of the weapon is scored as a miss.

Figure 10:
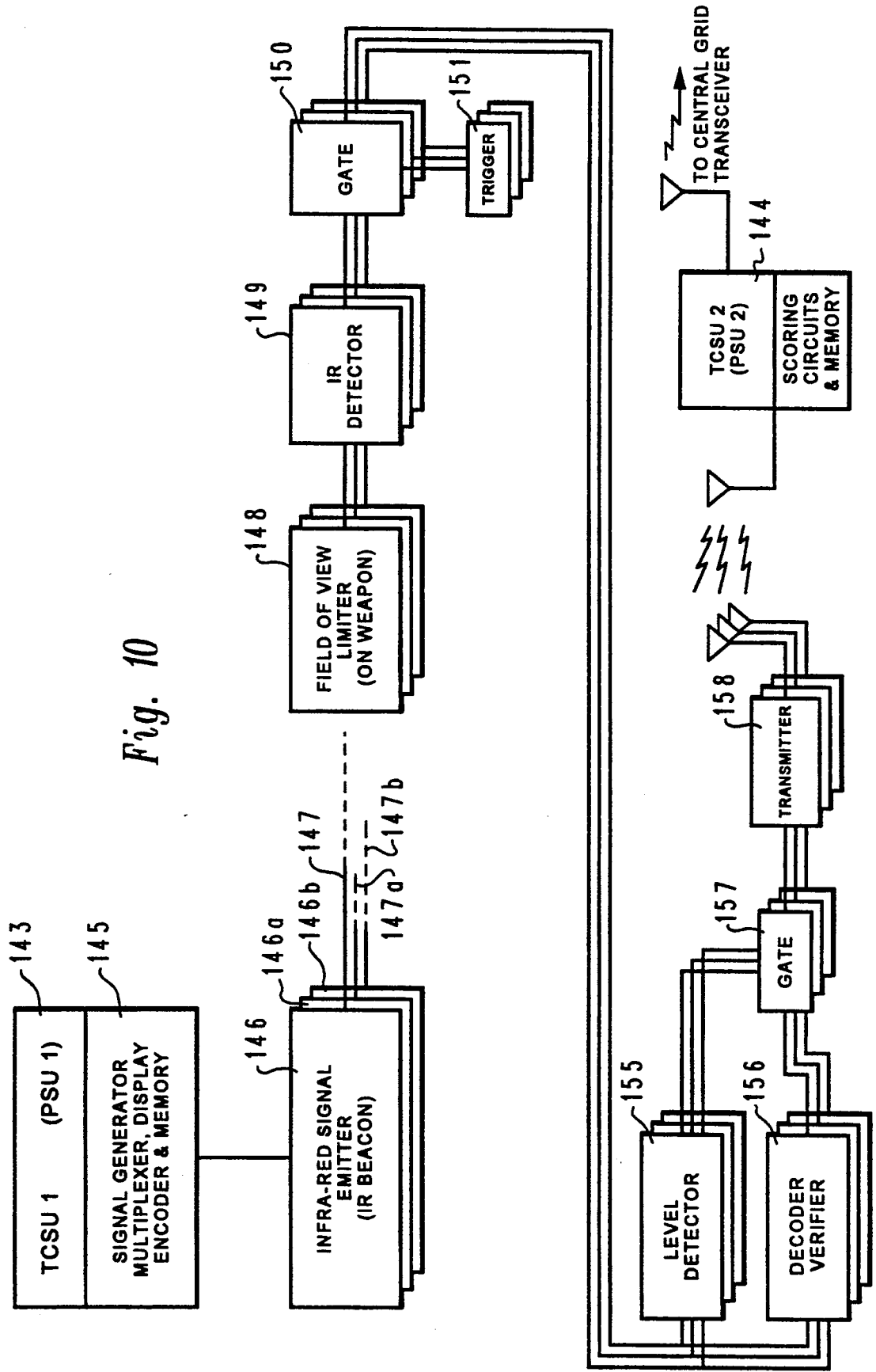
FIG. 10 is a diagram illustrating the operation of the typical line-of-sight weapon of FIG. 9.

The foregoing features and principles of operation of the Line-of-Sight weapons are illustrated in FIGS. 9 and 10. There, in FIG. 9, there are fragmentarily depicted a simulated weapon such as the cross bow 68 shown in FIG. 4, the very limited field of view (arc 133—133a measured between imaginary lines 134 and 135) available to the weapon sensor as mentioned above, and an encoded infra-red energy emitting beacon 136. A bore sight or sighting tube 137 is shown mounted on the weapon 68, such tube being effective in accordance with the preferred embodiment hereof to limit the field of view of an infra-red sensor element 138 to the arc defined by angle 133—133a. External sights are depicted by the protrusions 139 and 140. By adjusting the field of view afforded infra-red sensor element 138, the level of precision of targeting will, of course, be correspondingly adjusted.

FIG. 10 illustrates the principal components employed in practicing the Line-of-Sight features of the invention. There, it will be seen are two target coordination and service units, unit one being designated 143 and unit two being designated 144. Unit one, of course, will be on or about the person of one player-participant, and unit two will be on or about the person of another player-participant. To facilitate description of operation, only the signal generator/multiplexer/encoder circuits 145 and representative associated Infra-red Signal Emitters (IR Beacons) are depicted in FIG. 10 for player-participant one, whereas representative detection and processing circuits associated with three weapons of the other player-participant (Player-participant two) illustrate the plural weapon capabilities of the system. Although the following description describes one of the plurality of weapons detection and processing circuits, it is intended that the description include a plurality (as shown). Accordingly, when the singular is employed in the following description, it should be extended to the plural as the context admits.

It will be recalled from the description above, that a unique encoded signal is generated for each target associated with a target coordination and service unit (TCSU). In addition to such unique encoded signal being employed for identifying its target through radio frequencies, it is also employed for causing a corresponding generation and emission of a similarly encoded infra-red signal from an infra-red (IR) beacon as indicated at 144. At this point, it should be noted that to illustrate the multiplicity of target-indicating IR beacons associated with each TCSU, multiple units 144a and 144b are included. Of course, it will be understood that as many uniquely coded IR Beacons are included as there are individual targets for which individual recognition is desired. Lines 147, 147a and 147b represent the propagation of infra-red energy which, as will be recalled travels essentially on a line-of-sight path. At some distance away from IR beacons 146/146a/146b (but within the permissible range of operation which is contemplated as being within about 60 feet), will be one or more simulated line-of-sight weapons as described above. On each of these weapons, there will be a field-of-view limiter 148 corresponding to bore sight or sighting tube 137 of FIG. 9, followed by an IR detector 149 which corresponds to IR detector 138. As will be observed, the output from the IR detector 149 is connected to conventional gating circuits 150 which prevent further passage of signals from IR detector 149 unless and until the associated weapon trigger is actuated, whereupon, during a very brief predetermined interval (preferably about one-tenth of a second) the gate 150 is closed to permit signal passage.

When signals are passed through gate 150, they are simultaneously conducted via the indicated paths to the inputs of level detector 155 and decoder verifier 156. These again, are conventional circuits well known in the art. The level detector is activated only when its input signal exceeds a predetermined threshold level, thereby providing protection against extraneous spurious signals that otherwise might find their way into the system. Accordingly, gates 157 are closed only for signals that exceed such threshold level. Decoder/verifier circuits 156, on the other hand decode the received signal in a manner similar to the decoding of the radio frequency signals described above, in order to identify the particular target (beacon) whose signal has activated the IR detector 149. Thus, if the signal level meets the threshold level test, the decoded signals produced by decoder/verifier 156 are passed through gates 157 to a very low power transmitter 158 which communicates the information represented by the signal to the associated TCSU, in this case, TCSU2.

In addition to the foregoing, when trigger 151 is depressed, a gate trigger signal is produced and communicated directly to the transmitter 158 over paths (not shown). Accordingly, such transmitter 158 recognizes that during the ensuing brief time interval (in this preferred embodiment about one-tenth second), it should receive a decoded/verified signal through gate 157 if a valid hit was scored. If such decoded/verified signal is not received through gate 157 during such brief interval, then transmitter 158 sends to its associated TCSU an indicated that the weapon was fired but that a miss occurred.

Further reference to FIG. 10 reveals the presence of the scoring circuits to which reference is made above. Such scoring circuits are well known in the art and preferably are any of a variety of incrementing circuits that add hit and miss indications as noted by the aforementioned signals. Visual indications of such (together with any of a variety of other status conditions) are displayed (as desired) by the display 77 of FIG. 5. They also are communicated from the Target Coordination and Service Units (Personal Service Units) via the above-described communication links to the grid transceivers of the grids in which the TCSUs are located at the time of transmission.

Figure 11:
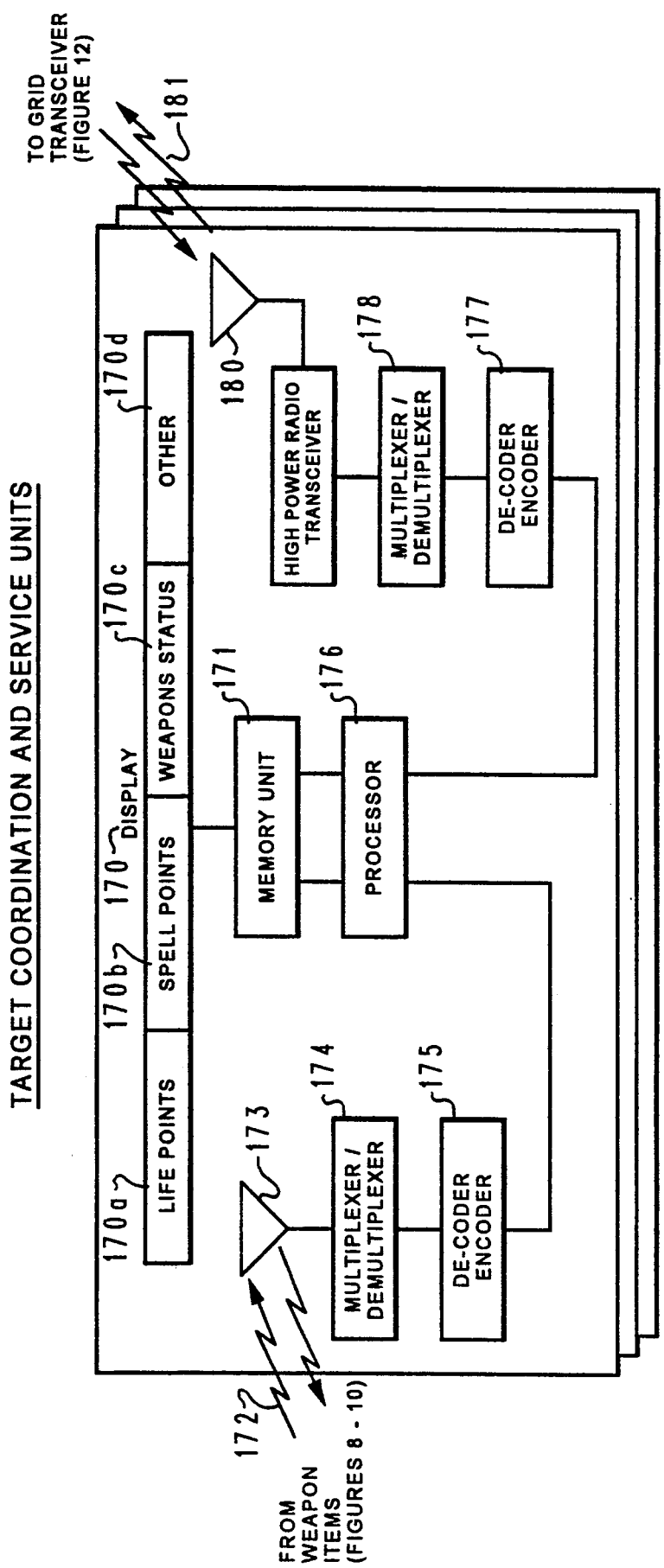
FIG. 11 is an illustration of a Target Coordination and Service Unit.

The principal operative elements of the Target Coordination and Service Units (Personal Service Units) are illustrated by FIG. 11. There, it will be observed, are a display 170 illustrated as including indications of representative scoring parameters such as "life points" 170*a*, "spell points" 170 *b*, "weapons status" 170*c* and "other" 170*d*. It should be understood, however, that such indications are provided only to illustrate the display features hereof, since it will be evident to those skilled in the art that any of a variety of useful status or scoring parameters may be selected, depending upon the types of games being administered.

Each TCSU includes a memory as indicated at 171. Such memory can be any of a variety well known in the art and is selected to include sufficient capacity to store all the information needed to fulfill the requirements of the particular games to be played. In such memory, there are stored (in accordance with principles well known in the art), data which is displayed by display 170 as well as data which is transferred to and from the grid control transceiver and/or the above-described central control console.

It will be recalled that in the foregoing description of representative contact and line-of-sight weapons in FIGS. 8–10, reference was made to radio frequency communications between each TCSU and it associated weapons. Such is illustrated in FIG. 11 by the representations of radio waves 172 which are transceived by antenna 173. Thereafter, the aformentioned information encoded thereon is processed in accordance with conventional techniques by multiplexer/demultiplexer 174, decoded/encoded by decoder/encoder 175 and introduced to conventional microprocessor 176 from whence information is interchanged with memory unit 171. For the asynchronous embodiment which is described below in connection with FIG. 13, selected scoring and control information is transmitted from the TCSU to its associated grid transceiver immediately upon being processed by the processor 176. However, for the synchronous embodiment which is described below in connection with FIG. 14, such selected scoring and control information is held in memory 171 until the TCSU is polled by its associated grid transceiver, at which time such information is transmitted to the grid transceiver. In either event, information interchanged by the TCSU with its associated grid transceiver is processed through decoder/encoder 177, multiplexer/demultiplexer 178, relatively high power radio transceiver 179 and antenna 180 whence it is communicated via radio waves 181 to the grid transceiver 48 of FIGS. 6 and 12.

It will be recalled that each of the above-described grids is provided with its own electrically-centered transceiver as illustrated in FIGS. 3 and 6. Although in FIG. 6 a single transceiving antenna 89 is depicted, in FIG. 12 such transceiving function is illustrated by showing antenna 89 with two antenna designations 89*a* and 89*b*. However, it should be understood that this is for completeness of illustration and is not intended to imply the presence of two separate items of antenna hardware, although such could, of course, be provided if desired in accordance with principles well known in the art.

Figure 12:
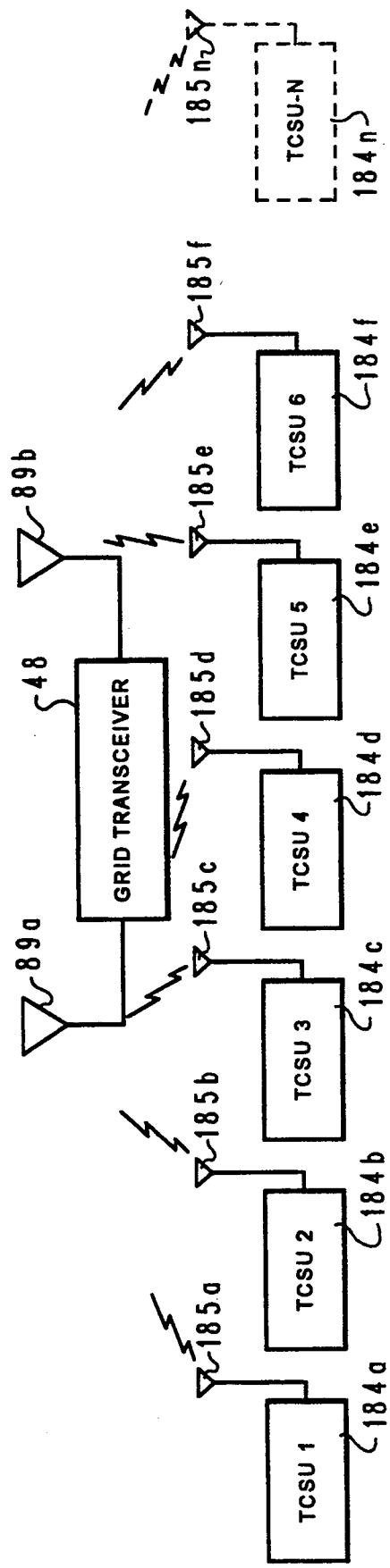
FIG. 12 is a diagram illustrating the relationships between a typical grid transceiver and its associated Target Coordination and Service Units.

Further reference to FIG. 12 reveals the depiction of a plurality of Target Coordination and Service Units (TCSU's) associated with a single grid. These are identified with designators 184*a*–184*n*. Also, as will be observed, each is depicted as having its own transceiving antenna system 185*a*–185*n* with which transceiving communication is conducted with the grid transceiver 48 within which grid such TCSU's are physically present. When a TCSU moves physically from one grid to another, transceiving communication is discontinued with the departed grid and established with the entered grid. It should also be observed that although many of the Target Coordination and Service Units are contemplated as being carried on the persons of participants, that some of them may be associated with inanimate objects which may be either mobile or immobile. However, the principal of operation of the Target Coordination and Service Units is similar and therefore falls within the operational description given herein.

Figure 13:
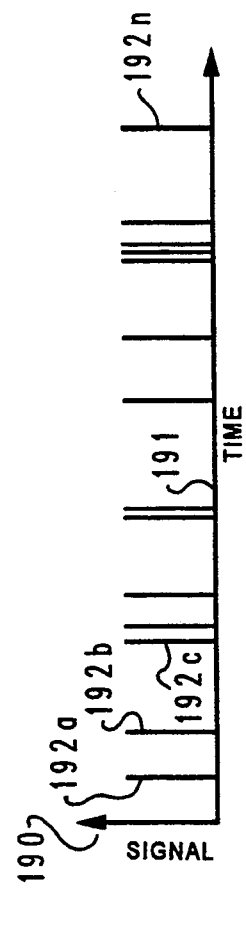
FIG. 13 is a diagram illustrating transmission timing in an asynchronous system.
Figure 14:
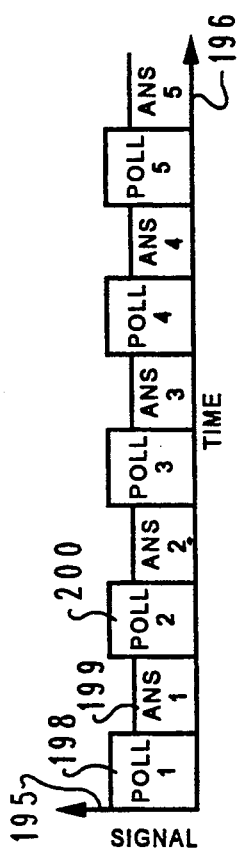
FIG. 14 is a diagram illustrating transmission timing in a synchronous system.

As mentioned above, among the many features of the invention are the flexibility and versatility of the system and its component sub-systems. Included in such flexibility and versatility are the alternative features of synchronous and asynchronous operation. Such synchronous and asynchronous operations are illustrated in FIGS. 13 and 14. However, before proceeding to an examination of such figures, some additional background may be helpful. Thus, by "Synchronous", is meant the repetitive sequential polling by a grid transceiver of all TCSU's within its grid and the provision of a time interval for responsive transmission by each TCSU that is reserved only for that TCSU, thus preventing simultaneous or overlapping transmission by two or more TCSU's. It also includes the corresponding sequential polling by the central control console computer of each of the grid transceivers. Conversely, by "Asynchronous" is meant the random transmission by TCSU's of information to their grid transceivers, depending statistically upon the likelihood that simultaneous transmissions will occur with sufficient infrequency that errors resulting therefrom will be minimal or at least at an acceptable level of inaccuracy.

The principles according to the invention contemplate the employment of either asynchronous or synchronous communication between TCSU's and their associated grids. According to the asynchronous mode, information-bearing signals are generated and such information is communicated from a TCSU to its associated grid transceiver immediately upon generation of the information involved, thus imparting to such signals a random character. For example, when, as described above, the weaponry circuits detect a valid incident (a hit), then an indication of such valid incident is immediately communicated from the weapon to the Target Coordination and Service Unit and thereupon transmitted immediately to the associated grid transceiver without checking to ascertain whether or not the frequency employed is in use. Since such transmissions may be relatively random in occurrence, there is a possibility that two such transmissions may occur simultaneously so that neither is successfully received and decoded by the grid transceiver circuits. However, by limiting transmissions to very brief intervals, the probabilities of such simultaneous transmissions occurring is rendered exceedingly small, thus providing a very high accuracy rate.

As will be observed from reference to FIG. 13, a graph illustrates the foregoing. There, in FIG. 13, there are illustrated ordinate 190 which is designated "signal", and abscissa 191 which is designated "time." The very brief transmission bursts are shown by the thin vertical lines 192a-192n, and in the illustration shown occur at randomly-located times which do not overlap. However, it will be evident that the asynchronous system illustrated by FIG. 13 does not provide complete protection against an occasional simultaneously transmission.

One way of preventing simultaneous transmission is by including polling circuits. Polling circuits are generally known in the art, and it will therefore be evident that those skilled therein will recognize the representation of FIG. 14 as being illustrative thereof. There, in FIG. 14, the ordinate 195 represents signals and abscissa 196 represents time. Circuits of types well known in the art are included within each grid transceiver and sequentially produce encoded signals severally representative of its associated Target Coordination and Service Units. Such signals are received via the transceiving paths previously described and when a TCSU receives such a signal that is encoded with its code, it develops and transmits a reply signal that includes selected information that has been stored in its memory as described above. Thus, for example, in time sequence, the grid transceiver develops and transmits poll signal 198, and waits during the interval of time occupied by Answer 1 time slot 199 for a response. Thereafter it proceeds to develop and transmit poll signal 200, waiting during the interval represented by Answer 2 time slot 201 for a response. It then continues in the manner shown to poll the remaining Target Coordination and Service Units until all of its associated Units have been polled, after which it recycles to begin the next polling sequence. This continues unless and until interrupted momentarily by the need for the grid transceiver to transmit other command signals or to provide time intervals for the reception of other types of information, after which the polling of individual Units is resumed. By utilization of the synchronous polling techniques, simultaneous transmission of incident-representing signals by two or more TCSU's is positively prevented.

Another way of preventing simultaneous transmission of signals is by including "listening circuits" in each TCSU of an asynchronous system. Such circuits are well known in the art and therefore are not detailed herein. However, when using such circuits, any TCSU is disabled from transmitting so long as the frequency is in use.

Figure 15:
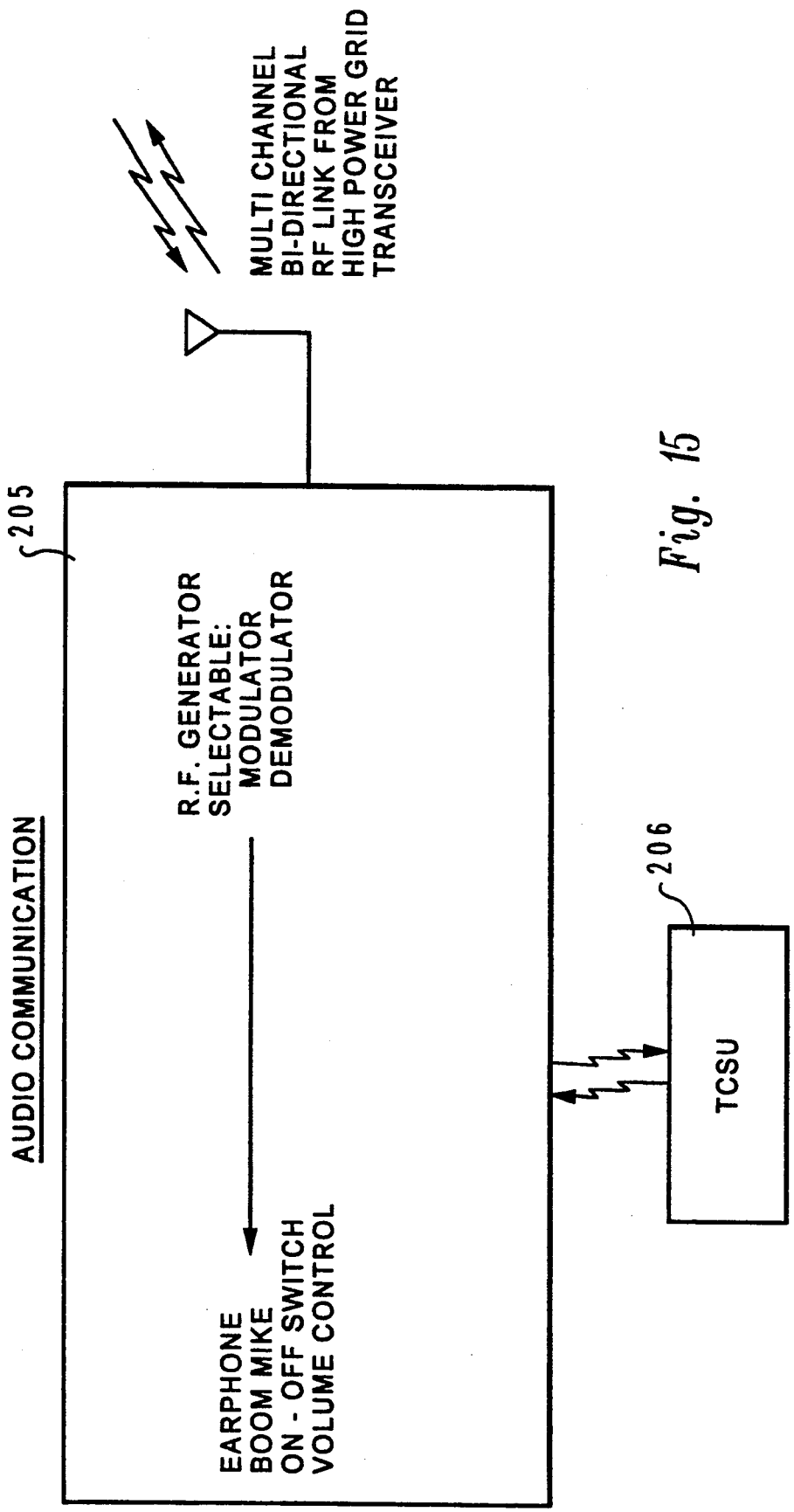
FIG. 15 is a diagram illustrating typical audio communications with a player-participant.

FIG. 15 illustrates an audio link that provides optional audio communication with a player/participant. There, it will be observed, are depicted an audio communication module 205 constructed in accordance with principles well known in the art. Module 205 is in radio-frequency bi-directional communication with both the Target Coordination and Service Unit 206 and the associated grid transceiver such as transceiver 48 described above. In accordance with principles well known in the art, provision is made for earphone and boom-mike (or the like) transducers between the equipment and the user; and the equipment is shown to include a conventional r.f. generator and conventional volume control, selectable modulator/demodulator and other known elements as needed to establish and maintain audio communications between the player/participant and the control and supervisory components of the System as described above.

It will now be evident that there has been described herein, an improved Simulated Combat Entertainment System that exhibits attractive features as mentioned above. It should also be evident that the described System provides enhanced effectiveness while exhibiting improved operating characteristics; and that it is relatively simple in design and easy and cost effective to manufacture and use, thus contributing to its attractiveness and desirability.

Although the invention hereof has been described by way of example of a preferred embodiment, it will be evident that other adaptations and modifications may be employed without departing from the spirit and scope thereof. For example, other types of weapons could be employed.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A simulated combat entertainment system comprising:

(a) a plurality of targets each an emanating an ongoing unique signal differing from signals emanated by the others of said plurality of targets;
(b) a simulated weapon;
(c) means for operating said simulated weapon;
(d) target identification means interconnected with said simulated weapon responsive to deployment of said simulated weapon immediately adjacent one of said targets and responsive to the unique signal emanated from said one of said targets for identifying said one of said targets; and
(e) contact verification means interconnected with said target identification means and responsive to physical contact by said simulated weapon with said one of said targets for verifying a valid hit thereupon.

2. A simulated combat entertainment system according to claim 1 wherein said plurality of targets include predetermined and distinct parts of an object.

3. A simulated combat entertainment system according to claim 1 wherein each said unique signal includes a digitally encoded series of pulses unique to said unique signal.

4. A simulated combat entertainment system according to claim 1 wherein each said unique signal includes a carrier of the same frequency.

5. A simulated combat entertainment system according to claim 1 wherein said contact verification means includes a contact transducer on said simulated weapon.

6. A simulated combat entertainment system according to claim 5 wherein said contact transducer is an elongated distributed resistor.

7. A simulated combat entertainment system according to claim 5 wherein said contact transducer is an elongated piezo-electric element.

8. A simulated combat entertainment system comprising:
(a) a target having a plurality of different sub-target areas, each of said different sub-target areas emanating an ongoing signal unique to that sub-target area thus differing from signals emanated by the others of said different sub-target areas;
(b) a simulated weapon;
(c) means for operating said simulated weapon;
(d) sub-target identification means interconnected with said simulated weapon responsive to deployment of said simulated weapon immediately adjacent one of said different sub-target areas and responsive to the signal emanated from said one of said different sub-target areas for identifying said one of said different sub-target areas; and
(e) contact verification means interconnected with said sub-target identification means and responsive to physical contact by said simulated weapon with said one of said different sub-target areas for verifying a valid hit thereupon.

9. A simulated combat entertainment system according to claim 8 wherein said sub-target areas severally represent body parts of a simulated combatant.

10. A simulated combat entertainment system according to claim 9 wherein each said unique signal includes a digitally encoded series of pulses unique to said unique signal.

11. A simulated combat entertainment system according to claim 10 wherein each said unique signal includes a carrier of the same frequency.

12. A simulated combat entertainment system according to claim 11 wherein said contact verification means includes a contact transducer on said simulated weapon.

13. A simulated combat entertainment system according to claim 12 wherein said contact transducer is an elongated distributed resistor.

14. A simulated combat entertainment system according to claim 12 wherein said contact transducer is an elongated piezo-electric element.

15. A simulated combat entertainment system according to claim 8 further including a target coordination and service unit electrically interconnected with each of said sub-target areas, said target coordination and service unit including means for generating and distributing to each of said sub-target areas said signals unique to said sub-target areas.

16. A simulated combat entertainment system according to claim 8 further including target scoring means interconnected with said target verification means and responsive to verification of said valid hit for storing electrical indicia of said valid hit therein.

17. A simulated combat entertainment system comprising:
(a) a first target having a plurality of different first sub-target areas, said first sub-target areas each emanating an ongoing and different one of a first set of distinctive identifying signals;
(b) a first simulated weapon operatively associated with said first target
(c) a second target having a plurality of different second sub-target areas, said second sub-target areas each emanating an ongoing and different one of a second set of distinctive identifying signals;
(d) means for operating said first simulated weapon;
(e) first sub-target identification means interconnected with said first simulated weapon responsive to deployment of said first simulated weapon immediately adjacent one of said second sub-target areas and responsive to the distinctive signal emanated from said one of said second sub-target areas for identifying said one of said second sub-target areas; and
(f) contact verification means interconnected with said first sub-target identification means and responsive to physical contact by said first simulated weapon with said one of said second sub-target areas for verifying a valid hit thereupon.

18. A simulated combat entertainment system according to claim 17 further including a first target coordination and service unit electrically interconnected with said first sub-target areas and a second target coordination and service unit electrically interconnected with said second sub-target areas, said first target coordination and service unit including means for generating and distributing to said first sub-target areas said first set of identifying signals, and said second target coordination and service unit including means for generating and distributing to said second sub-target areas said second set of identifying signals.

19. A simulated combat entertainment system according to claim 17 in which said distinctive identifying signals are digitally encoded multiplexed signals.

20. A simulated combat entertainment system comprising:
(a) a first target having a plurality of different first sub-target areas, said different first sub-target areas each emanating an ongoing and different one of a first set of distinctive identifying signals;

(b) a first simulated weapon operatively associated with said first target;

(c) a second target having a plurality of different second sub-target areas, said different second sub-target areas each emanating an ongoing and different one of a second set of distinctive identifying signals;

(d) a second simulated weapon operatively associated with said second target;

(e) means for operating said first simulated weapon and said second simulated weapon;

(f) first sub-target identification means interconnected with said first simulated weapon responsive to deployment of said first simulated weapon immediately adjacent one of said second sub-target areas and responsive to the signal emanated from said one of said second sub-target areas for identifying said one of said second sub-target areas; and (g) contact verification means interconnected with said first sub-target identification means and responsive to physical contact by said first simulated weapon with said one of said second sub-target areas for verifying a valid hit thereupon.

21. A simulated combat entertainment system according to claim 20 further including a first target coordination and service unit electrically interconnected with said first sub-target areas and a second target coordination and service unit electrically interconnected with said second sub-target areas, said first target coordination and service unit including means for generating and distributing to said first sub-target areas said first set of distinctive identifying signals, and said second target coordination and service unit including means for generating and distributing to said second sub-target areas said second set of distinctive identifying signals.

22. A simulated combat entertainment system according to claim 20 in which said distinctive identifying signals are digitally encoded multiplexed signals.

23. A simulated combat entertainment system according to claim 20 further including target scoring means interconnected with said target verification means and responsive to verification of said valid hit for storing electrical indicia of said valid hit therein.

24. A simulated combat entertainment system according to claim 21 further including target scoring means interconnected with said target verification means and responsive to verification of said valid hit for storing electrical indicia of said valid hit therein.

25. A simulated combat entertainment system according to claim 24 wherein said target scoring means is included in said target coordination and service units.

26. A simulated combat entertainment system comprising a central control station having surveillance means, central control means and communications means; a geographical area of predetermined size having a plurality of grids regions, each grid region including grid communications means for bi-directionally communicating with said central control means, audio announcement means, and visual surveillance means; one of said grid regions including:

(a) a first target having a plurality of different first sub-target areas, said different first sub-target areas each emanating a different one of a first set of distinctive identifying signals;

(b) a first simulated weapon operatively associated with said first target;

(c) a second target having a plurality of different second sub-target areas, said different second sub-target areas each emanating a different one of a second set of distinctive identifying signals;

(d) a second simulated weapon operatively associated with said second target;

(e) means for operating said first simulated weapon and said second simulated weapon;

(f) first sub-target identification means interconnected with said first simulated weapon responsive to deployment of said first simulated weapon adjacent one of said second sub-target areas and responsive to the signal emanated from said one of said second sub-target areas for identifying said one of said second sub-target areas; and (g) contact verification means interconnected with said first sub-target identification means and responsive to contact by said first simulated weapon with said one of said second sub-target areas for verifying a valid hit thereupon.

27. A simulated combat entertainment system according to claim 26 further including a first target coordination and service unit electrically interconnected with said first sub-target areas and a second target coordination and service unit electrically interconnected with said second sub-target areas, said first target coordination and service unit including means for generating and distributing to said first sub-target areas said first set of distinctive identifying signals, and said second target coordination and service unit including means for generating and distributing to said second sub-target areas said second set of distinctive identifying signals.

28. A simulated combat entertainment system according to claim 26 in which said distinctive identifying signals are digitally encoded multiplexed signals.

29. A simulated combat entertainment system according to claim 26 further including target scoring means interconnected with said target verification means and responsive to verification of said valid hit for storing electrical indicia of said valid hit therein.

30. A simulated combat entertainment system according to claim 27 further including target scoring means interconnected with said target verification means and responsive to verification of said valid hit for storing electrical indicia of said valid hit therein.

31. A simulated combat entertainment system according to claim 30 wherein said target scoring means is included in said target coordination and service units.

32. A simulated combat entertainment system according to claim 29 in which said first and said second target coordination and service units each include memory for storing said electrical indicia.

33. A simulated combat entertainment system according to claim 32 further including means in said grid communication means for periodically sending sequential interrogating signals to said target coordination and service units thereby to cause said target coordination and service units sequentially to transmit to said grid communication means signals severally representing said electrical indicia.

34. A simulated combat entertainment system according to claim 32 further including spontaneous transmitting means in each of said target coordination and service units for spontaneously transmitting to said grid communication means signals representing said electrical indicia of a valid hit when said grid communications means is not receiving or transmitting other signals; and when said grid communications means is receiving or transmitting other signals, to postpone spontaneously transmitting said signals until said grid communications means is not busy.

35. A simulated combat entertainment system according to claim 33 further including momentary transmission control means for causing the transmissions from said target coordination and service units to be momentary only.

36. A simulated combat entertainment system according to claim 34 further including momentary transmission control means for causing the transmissions from said target coordination and service units to be momentary only.

37. A simulated combat entertainment system comprising a central control station having surveillance means, central control means and communications means; a geographical area of predetermined size having a plurality of grids regions, each grid region including grid communications means for bi-directionally communicating with said central control means, audio announcement means, and visual surveillance means; one of said grid regions including:

(a) a first target having a plurality of different first sub-target areas, said different first sub-target areas each emanating a different one of a first set of distinctive identifying signals;

(b) a first simulated weapon operatively associated with said first target;

(c) a second target having a plurality of different second sub-target areas, said different second sub-target areas each emanating a different one of a second set of distinctive identifying signals;

(d) a second simulated weapon operatively associated with said second target;

(e) means for operating said first simulated weapon and said second simulated weapon;

(f) first sub-target identification means interconnected with said first simulated weapon responsive to activation of said first simulated weapon while said first simulated weapon is pointed toward one of said second sub-target areas and responsive to the signal emanated from said one of said second sub-target areas for identifying said one of said second sub-target areas; and (g) hit verification means interconnected with said first sub-target identification means and responsive to said identification of said one of said second sub-target areas by said first simulated weapon for verifying a valid hit thereupon.

38. A simulated combat entertainment system according to claim 37 further including a first target coordination and service unit electrically interconnected with said first sub-target areas and a second target coordination and service unit electrically interconnected with said second sub-target areas, said first target coordination and service unit including means for generating and distributing to said first sub-target areas said first set of distinctive identifying signals, and said second target coordination and service unit including means for generating and distributing to said second sub-target areas said second set of distinctive identifying signals.

39. A simulated combat entertainment system according to claim 37 in which said distinctive identifying signals are digitally encoded multiplexed infra-red signals.

40. A simulated combat entertainment system according to claim 37 further including target scoring means interconnected with said hit verification means and responsive to verification of said valid hit for storing electrical indicia of said valid hit therein.

* * * * *